United States Patent
Bonera

(10) Patent No.: US 10,124,639 B2
(45) Date of Patent: Nov. 13, 2018

(54) WHEEL SUSPENSION FOR A MOTOR VEHICLE

(71) Applicant: BRIST AXLE SYSTEMS S.R.L., Montichiari (Brescia) (IT)

(72) Inventor: Danilo Bonera, Collebeato (IT)

(73) Assignee: BRIST AXLE SYSTEMS S.R.L., Montichiari (IT)

( * ) Notice: Subject to any disclaimer, the term of this patent is extended or adjusted under 35 U.S.C. 154(b) by 0 days.

(21) Appl. No.: 15/034,389

(22) PCT Filed: Nov. 5, 2014

(86) PCT No.: PCT/EP2014/073780
§ 371 (c)(1),
(2) Date: Jul. 13, 2016

(87) PCT Pub. No.: WO2015/067638
PCT Pub. Date: May 14, 2015

(65) Prior Publication Data
US 2016/0318363 A1    Nov. 3, 2016

(30) Foreign Application Priority Data
Nov. 5, 2013    (DE) .................. 10 2013 222 442

(51) Int. Cl.
*B60G 3/20*      (2006.01)
*B60G 7/00*      (2006.01)

(52) U.S. Cl.
CPC .............. *B60G 3/20* (2013.01); *B60G 7/008* (2013.01); *B60G 2200/422* (2013.01); *B60G 2204/148* (2013.01); *B60G 2206/50* (2013.01)

(58) Field of Classification Search
CPC .... B60G 3/20; B60G 7/008; B60G 2200/422; B60G 2206/50; B60G 2204/148
See application file for complete search history.

(56) References Cited

U.S. PATENT DOCUMENTS

| 2,501,796 A | * | 3/1950 | Tucker | B60G 11/08 |
| | | | | 267/227 |
| 2,689,746 A | * | 9/1954 | Wagner | B60G 3/20 |
| | | | | 261/114.1 |

(Continued)

FOREIGN PATENT DOCUMENTS

| DE | 3721737 A1 | 1/1989 |
| DE | 4343525 A1 | 6/1994 |

(Continued)

OTHER PUBLICATIONS

Written Opinion of the International Searching Authority from counterpart PCT App No. PCT/EP2014/073780.

(Continued)

*Primary Examiner* — Paul N Dickson
*Assistant Examiner* — Timothy Wilhelm
(74) *Attorney, Agent, or Firm* — Shuttleworth & Ingersoll, PLC; Timothy Klima

(57) ABSTRACT

A wheel suspension for a motor vehicle, particularly for a steerable drive wheel, includes a steering knuckle support and at least one transverse arm, which, at a first end thereof, is swivel-mounted about a horizontal axis, and, at the second end thereof, opposite the first end, forming a resting point for the steering knuckle support, is hinged onto the steering knuckle support. The steering knuckle support has a wheel hub with an outer rest surface for receiving a vehicle wheel that turns via the wheel hub. The wheel hub has, radially within the outer rest surface, a through opening for receiving a flange shaft that turns with the vehicle wheel.

4 Claims, 2 Drawing Sheets

(56) References Cited

U.S. PATENT DOCUMENTS

| | | | | |
|---|---|---|---|---|
| 3,467,406 | A * | 9/1969 | Henry-Biabaud | B60G 3/20 267/257 |
| 3,877,716 | A * | 4/1975 | Ostwald | B60B 27/00 188/18 A |
| 4,792,020 | A | 12/1988 | Okumura et al. | |
| 4,802,688 | A * | 2/1989 | Murakami | B60G 3/265 280/124.138 |
| 4,871,187 | A | 10/1989 | Schaible | |
| 5,374,076 | A | 12/1994 | Lee | |
| 5,597,171 | A | 1/1997 | Lee | |
| 5,691,584 | A * | 11/1997 | Toida | H02K 1/185 180/65.51 |
| 6,113,120 | A * | 9/2000 | Heap | B60G 3/20 280/124.125 |
| 6,347,802 | B1 | 2/2002 | Mackle et al. | |
| 6,371,500 | B1 * | 4/2002 | Goddard | B60G 3/205 280/86.754 |
| 6,450,585 | B1 * | 9/2002 | Kochsiek | B60B 27/00 180/258 |
| 6,729,633 | B1 * | 5/2004 | Irwin | B62D 17/00 280/86.75 |
| 7,121,367 | B2 * | 10/2006 | Ajiro | B60K 7/0007 180/65.51 |
| 7,185,902 | B1 | 3/2007 | Lloyd | |
| 7,461,851 | B2 * | 12/2008 | Yamamura | B60G 3/20 180/311 |
| 7,559,403 | B2 * | 7/2009 | Schmitz | B60G 3/20 180/344 |
| 7,568,711 | B2 * | 8/2009 | Houser | B60G 7/008 280/86.751 |
| 7,733,083 | B2 * | 6/2010 | Ozaki | B60B 27/0005 324/173 |
| 7,798,506 | B2 * | 9/2010 | LeBlanc, Sr. | B60G 3/20 280/124.135 |
| 7,954,835 | B2 * | 6/2011 | Nakamura | B60G 3/20 280/124.135 |
| 8,205,896 | B2 * | 6/2012 | Gell | B60G 3/20 280/124.135 |
| 8,382,130 | B2 * | 2/2013 | Nakamura | B60G 3/20 280/124.135 |
| 8,459,671 | B2 * | 6/2013 | Kuwabara | B62K 5/01 180/374 |
| 8,573,615 | B2 * | 11/2013 | Kuwabara | B60G 3/06 180/253 |
| 2007/0199748 | A1 * | 8/2007 | Ross | B60G 3/20 180/65.51 |
| 2008/0084042 | A1 * | 4/2008 | Dinakaran | B60G 7/008 280/93.512 |
| 2008/0309042 | A1 * | 12/2008 | Gercke | B60G 7/008 280/93.512 |

FOREIGN PATENT DOCUMENTS

| | | | |
|---|---|---|---|
| DE | 19518154 A1 | 11/1996 | |
| DE | 102007047787 A1 * | 5/2009 | B60G 3/20 |
| DE | 102008021786 A1 | 11/2009 | |
| EP | 0402777 A1 | 12/1990 | |
| EP | 0561437 A1 | 9/1993 | |
| EP | 0680836 A1 | 11/1995 | |
| EP | 0799723 A1 | 10/1997 | |
| EP | 0979769 A2 | 2/2000 | |
| EP | 2441602 A1 | 4/2012 | |
| EP | 2207690 | 2/2013 | |
| WO | WO2009062823 | 5/2009 | |
| WO | WO2011070387 A1 | 6/2011 | |

OTHER PUBLICATIONS

International Search Report dated Jun. 10, 2015 from counterpart PCT App No. PCT/EP2014/073780.
German Office Action dated Feb. 6, 2015 from counterpart German App No. 10 2013 222 442.7.

* cited by examiner

WHEEL SUSPENSION FOR A MOTOR VEHICLE

This application is the National Phase of International Application PCT/EP2014/073780 filed Nov. 5, 2014 which designated the U.S.

This application claims priority to German Patent Application No. DE102013222442.7 filed Nov. 5, 2013, which application is incorporated by reference herein.

The present invention refers to a wheel suspension for a motor vehicle, particularly for a steerable drive wheel, according to the preamble of claim 1.

In the case of independent wheel suspension systems, to which the present application particularly refers, a distinction is conventionally made between a first type with a kingpin and a second type with a ball joint. According to the first type, a steering knuckle support is connected to an upper transverse arm and to a lower one by means of two universal joints, one or both of the transverse arms also being realizable as control arms, and each universal joint having two hinge joints (knuckle joints), positioned one after the other in the direction of the flow of forces from the steering knuckle support to the transverse arm, each of which having a hinge bolt or hinge pin through the central axis of which the axis of rotation extends. In this regard, the axes of rotation of both hinge joints associated with the steering knuckle support, that is to say of the hinge joints preceding in the flow of forces from the steering knuckle support to the transverse arm, merge in a common rotation axis and, accordingly, both hinge bolts or both hinge pins of this first hinge joint are realized as a single piece one with the other or are connected by a number of parts that are mechanically joined in a fixed manner one to the other and positioned coaxially with respect to each other. This common hinge bolt or hinge pin is also called a kingpin. Owing to the upper transverse arm and the lower transverse arm provided, this wheel suspension is also defined as a double-wishbone suspension.

In the case of the second type of wheel suspension, which can likewise be realized as a double-wishbone suspension, the rest points by means of which the transverse arms are hinged onto the steering knuckle support, are realized as a ball joint. As a result, the positioning of the two hinge joints one after the other in the flow of forces is not needed to achieve the functionality of a universal joint or even of a joint having even more degrees of freedom.

See the following documents for the relative patented state of the art.
EP 2 207 690 B1
EP 0 979 769 B1
EP 0 402 777 B1
EP 2 441 602 A1
DE 10 2008 021 786 A1
DE 195 18 154 C2
DE 43 43 525 A1.

The advantages of the first type of wheel suspension mentioned lie in a relatively sturdy structure with forces of friction being reduced during compression and steering of the suspended wheel by means of the wheel suspension. The heavy weight and relatively large volume are considered to be disadvantages.

In the case of the second type of wheel suspension mentioned, an approximately lighter and more compact structural form is definitely achievable, but during compression and steering of the suspended wheel, intensive forces of friction appear, determining a shortening of the service life.

The aim of the present invention is to provide a wheel suspension, particularly an independent wheel suspension, which combines the advantages of the types of wheel suspensions mentioned hereinabove, while also fully preventing the disadvantages thereof. In particular, the intention is to provide a wheel suspension for a motor vehicle, for example a truck, construction machinery or other special heavy-duty vehicles, in which a sturdy structure of lower weight is achieved, while also featuring reduced forces of friction and a prolonged service life.

The aim according to the invention is reached by a wheel suspension for a motor vehicle having characteristics as disclosed herein. Advantageous and particularly useful configurations of the invention are provided in the present disclosure.

The wheel suspension according to the invention for a motor vehicle, which is realized for example as an independent wheel suspension system and particularly realized for a steerable drive wheel of the motor vehicle, has a steering knuckle support and at least one transverse arm, preferably two transverse arms, for example an upper transverse arm and a lower transverse arm. The at least one transverse arm is swivel-mounted, at a first end thereof, about a horizontal axis and, with this end, it is connected for example to a vehicle chassis or a vehicle body or to another supporting component of the motor vehicle.

At the second end, the at least one transverse arm, or if two transverse arms are provided, each one of the two transverse arms, is hinged onto the steering knuckle support, the second end, which is positioned accordingly on the side of the first end and facing the opposite direction, forming a resting point for the steering knuckle support.

The steering knuckle support has a wheel hub with an outer rest surface for receiving a vehicle wheel that turns by means of the wheel hub. For example, a wheel mount is provided, mounted on the outer support surface of the wheel hub by means of a bearing, particularly a roller bearing, so that the wheel can turn on the stationary or non-rotating wheel hub.

According to the invention, now in the wheel hub, radially within the outer rest surface, a through opening is provided for receiving a flange shaft that turns with the vehicle wheel.

Preferably, the resting point, in which the at least one transverse arm is hinged onto the steering knuckle support, has a universal joint with two axes of rotation that are perpendicular or substantially perpendicular with respect to each other. The angle between the axes of rotation ranges for example between 85° and 95°, particularly between 88° and 92°. In the case of two transverse arms, particularly parallel transverse arms, each transverse arm preferably has a corresponding resting point with a universal joint with two axes of rotation that are perpendicular with respect to each other. In general, in the case of the present invention, it is important to note that characteristic of the mutually perpendicular axes is not limited to an exact 90° angle, but rather, that possible deviations of several degrees, for example 2 to 5 degrees, are possible, particularly owing to the mechanical machining of the components.

In a particularly convenient manner, in each one of the one or more universal joints, two hinge joints are provided and positioned one after the other in the flow of forces from the steering knuckle support to the first end of the at least one transverse arm; the two hinge joints form the at least substantially and mutually perpendicular axes of rotation, namely a first hinge joint, the axis of rotation of which is perpendicular to a line extending in a horizontal direction, and a second hinge joint, the axis of rotation of which extends parallel to the horizontal axis of the swivelling support at the first end of the transverse arm or of each transverse arm.

By virtue of its own turning movement on a respective axis of rotation, the hinge joints can also be defined as knuckle joints.

The first hinge joint (or all the first hinge joints) is preferably formed by a hole in the steering knuckle support and by a pin fastened in the second hinge joint on the transverse arm. In this regard, the pin is preferably mounted in the hole by means of two roller bearings positioned next to each other in the direction of the axis of rotation. In this regard, the roller bearings can be of different inner and/or outer diameters, particularly if the outer diameter of the respective pin varies in the area of its support.

It is convenient that the second hinge joint is formed by a knuckle joint at the second end of the transverse arm together with a hinge bolt that is mounted with two roller bearings in the knuckle joint, the hinge bolt supporting the pin and, in particular, being inserted therein with form-fitting and/or tight fitting.

As explained above, the wheel suspension system according to a particularly convenient embodiment is realized as a double-wishbone suspension, comprising a first upper transverse arm and a second lower transverse arm, each of which, at its first end, is swivel-mounted about a horizontal axis, and with its second end, forming the resting point for the steering knuckle support, is hinged onto the steering knuckle support.

If externally a wheel mount is provided on the wheel hub, then a flange shaft extending within the through opening of the wheel hub can have a radial flange at a first axial end, axially outside the wheel hub; at the front, the radial flange is connected, in particular fastened with screws, to the wheel mount, so that the flange shaft and the wheel mount turn together when the flange shaft is actuated by a corresponding power train of the motor vehicle, particularly by means of a combustion engine and/or electric motor. Obviously, an engine connection such as this would be possible additionally or alternatively also at the second axial end of the flange shaft.

A connection not directly on the front side is also possible, but in the area of the front side, for example radially inside.

It is particularly convenient that the flange shaft, at its second end opposite the first axial end, has a second radial flange that extends inside or axially outside the steering knuckle support and at which, the power of the power train of the motor vehicle can be supplied. Accordingly, the second radial flange is realized as a drive flange with connectors for starting up the power of a drive shaft, particularly a cardan shaft. In place of a flange extending radially and outwardly on the outer diameter out of the flange shaft, another option is also provided for connecting a drive shaft, or the flange shaft can be realized as a single piece with the drive shaft.

In the case of an embodiment of the wheel suspension as a double-wishbone suspension, the pins preferably fastened on the transverse arms are advantageously rotatable on a common axis of rotation and, spaced apart from each other on opposite sides, they are partially or completely positioned radially externally of the second radial flange of the flange shaft. In this particular case, it is convenient that the two pins are not combined in a shared kingpin or mechanically connected to each other by means of connection bolts, but rather, that they are separated and spaced with respect to each other without a direct mechanical connection. As a result, there is no direct mechanical connection transmitting rotatory motion from one pin to the next. Therefore, only an indirect mechanical connection is provided by means of the steering knuckle support and/or the two transverse arms and a vehicle component positioned between them, for example, the chassis of the vehicle.

By means of the embodiment of the wheel suspension according to the invention, an axle load of 10 metric tonnes or more can be achieved at a steering angle of 20° or more. The wheel suspension is reduced in weight and the forces introduced are ideally distributed. Owing to the roller bearings advantageously provided—for each joint two roller bearings being advantageously provided one next to the other on the axis of rotation—the forces of friction can be minimized and undesirable deformation can be prevented within the wheel suspension.

The invention shall now be described below, by way of example, with reference to an example embodiment and the accompanying drawings, of which:

Figure 1:
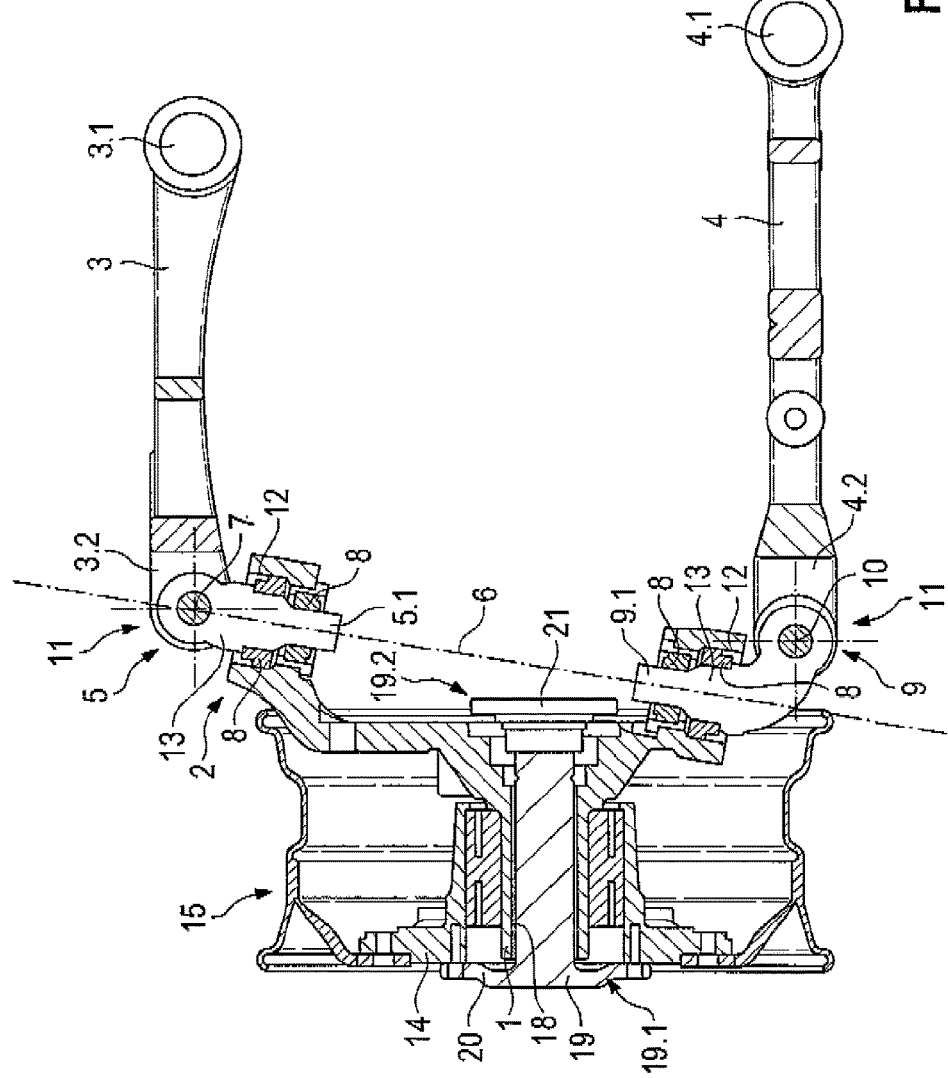
FIG. 1 is a partially sectioned side view of a wheel suspension configured according to the invention.
Figure 2:
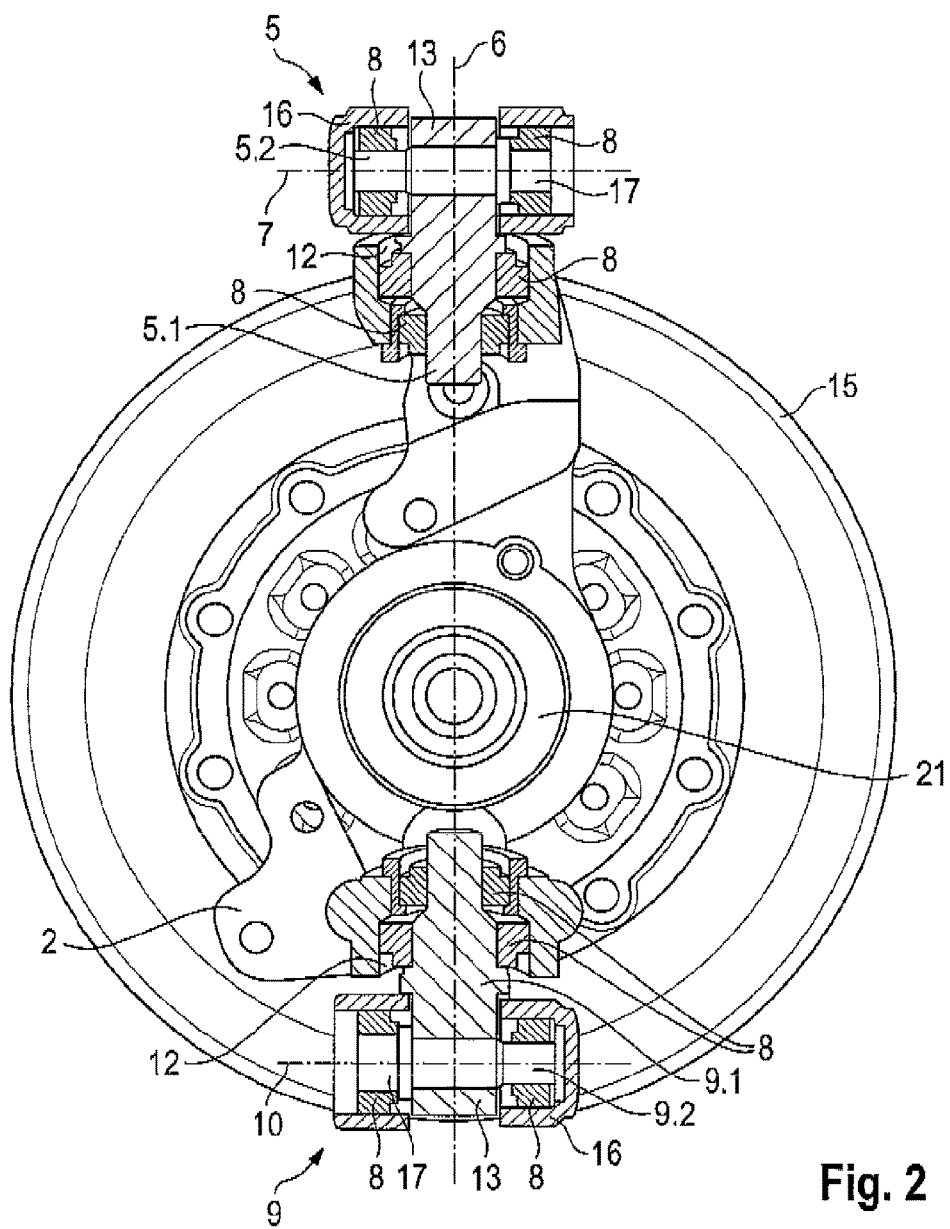
FIG. 2 is a view of the wheel suspension of FIG. 1 along the axis of rotation of the vehicle wheel, on the vehicle wheel rim, as seen from the inside.

The wheel suspension represented in FIG. 1 for a motor vehicle, herein for a steerable vehicle wheel driven by means of a power train of a vehicle that is not illustrated in detail herein, has a wheel hub 1 that rotatably supports a wheel mount 14 in which the wheel rim 15 is, in turn, fastened with screws. The wheel hub 1 is supported by a steering knuckle support 2 and in the example embodiment shown, it is realized as a single piece or flush fitting the steering knuckle support 2. The steering knuckle support 2 is in turn supported by two transverse arms 3, 4, each of which is hinged, with its first end 3.1, 4.1, pivotably about a horizontal axis, on a vehicle (not shown), for example on the relative chassis of the vehicle. At their second ends 3.2, 4.2, the two transverse arms—the first transverse arm 3, which is arranged above the steering knuckle support 2, and the second transverse arm 4, which is arranged below the steering knuckle support 2—are hinged, each forming a resting point 11 with a respective universal joint 5, 9 on the steering knuckle support 2. The upper universal joint 5 has the two axes of rotation 6, 7 at least substantially perpendicular with respect to each other and the lower universal joint 9 has the two axes of rotation 6, 10 at least substantially perpendicular with respect to each other; in this regard, see also the illustration in FIG. 2.

The upper universal joint 5 is made up of the first hinge joint 5.1 and the second hinge joint 5.2. The lower universal joint 9 is made up of the first hinge joint 9.1 and the second hinge joint 9.2. The two hinge joints 5.1, 5.2, 9.1, 9.2 are respectively positioned in the direction of the flow of forces from the drive wheel to the vehicle considered one after the other, the second hinge joint 5.2, 9.2 following the first hinge joint 5.1, 9.1.

The two first hinge joints 5.1, 9.1 have a common axis of rotation 6, on which the steering knuckle support 2 rotates during the steering movement of the vehicle wheel (see the rim 15). During compression (the spring and the shock absorber of the wheel suspension are not shown), the first universal joint 5 is rotated in the second hinge joint 5.2 on the rotation axis 7 and the second universal joint 9 is rotated in the second hinge joint 9.2 on the axis of rotation 10.

To form the first hinge joint 5.1 of the first (upper) universal joint 5, a pin 13 is received in a hole 12 in the steering knuckle support 2 and, therein, by means of two roller bearings 8 positioned one next to the other along the axis of rotation 6, it is mounted in the steering knuckle support 2 or in the hole 12 therein. The same holds for the pin 13 of the lower universal joint 9. To form the second hinge joint 5.2 of the upper universal joint 5, the pin 13 has a hinge bolt 17, which, in the example embodiment shown, is inserted in a hole of the pin 13 in a tight fitting or undersized fitting. At each of its two axial ends, the hinge bolt 17 is supported by a roller bearing 8 in each half of the knuckle joint 16 of the upper transverse arm 3. The same holds for the second hinge joint 9.2 of the lower universal joint 9; see also in this case the knuckle joint 16, the roller bearings 8 and the hinge bolt 17.

As is observable in the figures, the two pins 13 are positioned at a clear distance from each other on the axis of rotation 6. There is no direct connection between the two pins 13. Naturally, an indirect connection is achieved by means of the steering knuckle support 2, as the latter supports both pins, and for example by means of the chassis of the vehicle to which the two transverse arms 3, 4 are connected with their first ends 3.1, 4.1. In particular, however, there is no direct fixed connection between the two pins 13, that is to say between the pin 13 of the upper universal joint 5 and the pin 13 of the lower universal joint 9.

Inside a through opening 18, in the wheel hub 1, a flange shaft 19 is provided; at its first axial end 19.1, which faces a direction opposite the two transverse arms 3, 4, the flange shaft 18 has a radial flange 20 that extends axially outside the wheel hub 1. This radial flange 20, which extends radially outwards as far as the wheel mount 14, is connected at the front, for example fastened with screws, to the wheel mount 14; see the flange screwing shown.

At its second axial end 19.2, the flange shaft 19 has a second radial flange 21, which, in the example embodiment shown, extends in an axial direction outside the steering knuckle support 2 and is formed as a drive flange so as to start up the power of the no longer shown here vehicle power train.

In the example embodiment shown, the inner diameter of the through opening 18 in the wheel hub 1 is larger than the outer diameter of the opposite axial portion of the flange shaft 19, so that the flange shaft 19 turns without contact inside the wheel hub 1 or the steering knuckle support 2.

The invention claimed is:

1. A wheel suspension for a steerable drive wheel of a motor vehicle, comprising:
   a steering knuckle support;
   a first upper transverse arm and a second lower transverse arm, each of which, at a first end thereof, is swivel-mounted about a horizontal axis, and each of which at a second end thereof, forms a resting point for the steering knuckle support and is hinged onto the steering knuckle support;
   wherein each resting point includes a universal joint including two hinge joints positioned one after another in a flow of forces from the steering knuckle support to the first end of the respective transverse arm; the two hinge joints each forming two substantially and mutually perpendicular axes of rotation, the two hinge joints including a first hinge joint including a first axis of rotation which is substantially perpendicular to a line extending in a horizontal direction, and a second hinge joint including a second axis of rotation which extends at least substantially parallel to the horizontal axis of the swivel mount at the first end of the transverse arm;
   wherein each first hinge joint includes a hole in the steering knuckle support, two roller bearings positioned next to each other commonly on the first axis of rotation and a pin mounted in the hole by the two roller bearings and fastened to the second hinge joint;
   wherein the first axis of rotation of each of the first hinge joints is on a common axis of rotation, and the two pins of the first hinge joints are positioned at a clear distance from each other on the common axis of rotation and without direct connection to each other so that a line joining the two pins of the first hinge joints does not intersect any element of the wheel suspension between the two pins, the two pins being only indirectly mechanically connected to one another, with the only indirect mechanical connection between the two pins, other than a chassis of the motor vehicle, being provided by the steering knuckle support;
   wherein the steering knuckle support includes a wheel hub with an outer rest surface for receiving a vehicle wheel and, radially within the outer rest surface, a through opening;
   a rotating flange shaft that turns with the vehicle wheel positioned in the through opening, the rotating flange shaft including a first axial end and a second end opposite the first axial end, the second end including a drive flange that extends inside or axially outside the steering knuckle support and includes connectors for transmitting a power of a drive shaft;
   a wheel hub bearing provided on the outer rest surface to allow rotation of the vehicle wheel about the outer rest surface.

2. The wheel suspension according to claim 1, wherein each second hinge joint is formed by a knuckle joint at the second end of the transverse arm together and includes two roller bearings and a hinge bolt, with the hinge bolt being mounted with the two roller bearings in the knuckle joint, the hinge bolt supporting the pin and being inserted therein with at least one chosen from a form fitting and a tight fitting.

3. The wheel suspension according to claim 1, wherein the wheel suspension is a double-wishbone suspension.

4. The wheel suspension according to claim 1, and further comprising:
   a wheel mount that is mounted on the outer support surface of the wheel hub by the wheel hub bearing, the wheel mount including a threaded pin or internal thread for fastening a rim of the vehicle wheel,
   wherein the flange shaft extends within the through opening of the wheel hub at the first axial end, and axially outside the wheel hub, and includes a radial flange that is, at a front, connected to the wheel mount, so that the flange shaft and the wheel mount turn together.

\* \* \* \* \*